(12) United States Patent
Yamada et al.

(10) Patent No.: US 7,100,045 B2
(45) Date of Patent: Aug. 29, 2006

(54) SYSTEM, METHOD, AND PROGRAM FOR ENSURING ORIGINALITY

(75) Inventors: Asahiko Yamada, Tokorozawa (JP); Shuji Harashima, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 865 days.

(21) Appl. No.: 09/989,072

(22) Filed: Nov. 21, 2001

(65) Prior Publication Data

US 2002/0095578 A1 Jul. 18, 2002

(30) Foreign Application Priority Data

Nov. 22, 2000 (JP) .............................. 2000-356239

(51) Int. Cl.
*H04K 1/00* (2006.01)
*H04L 9/32* (2006.01)
*G06Q 20/00* (2006.01)
*H04L 9/00* (2006.01)

(52) U.S. Cl. ...................... 713/156; 713/175; 713/176
(58) Field of Classification Search ................ 713/156, 713/157, 175, 176, 180
See application file for complete search history.

(56) References Cited

U.S. PATENT DOCUMENTS

| | | | | |
|---|---|---|---|---|
| 5,638,446 A | * | 6/1997 | Rubin | 705/51 |
| 5,724,425 A | * | 3/1998 | Chang et al. | 705/52 |
| 6,021,491 A | * | 2/2000 | Renaud | 713/179 |
| 6,363,365 B1 | * | 3/2002 | Kou | 705/64 |
| 6,510,513 B1 | * | 1/2003 | Danieli | 713/156 |
| 2001/0037313 A1 | * | 11/2001 | Lofgren et al. | 705/67 |

FOREIGN PATENT DOCUMENTS

JP 08-185376 7/1996

* cited by examiner

Primary Examiner—Jacques H. Louis-Jacques
Assistant Examiner—Matthew Heneghan
(74) Attorney, Agent, or Firm—Oblon, Spivak, McClelland, Maier & Neustadt, P.C.

(57) ABSTRACT

Each of the embodiments of the present invention supplies date information issued from a third party to a digital signature of a first user apparatus for an electronic document. Originality of the electronic document is ensured by applying the digital signature of the third party to a set of the digital signature and date information. No electronic document is transmitted to the third party apparatus during originality assurance of the electronic document. Accordingly, it is possible to decrease loads to the third party and associated networks even if the third party apparatus is congested with accesses. Since there is registered an undeniable signature for a second user apparatus, it is possible to prevent the second user apparatus from denying the reception.

1 Claim, 13 Drawing Sheets

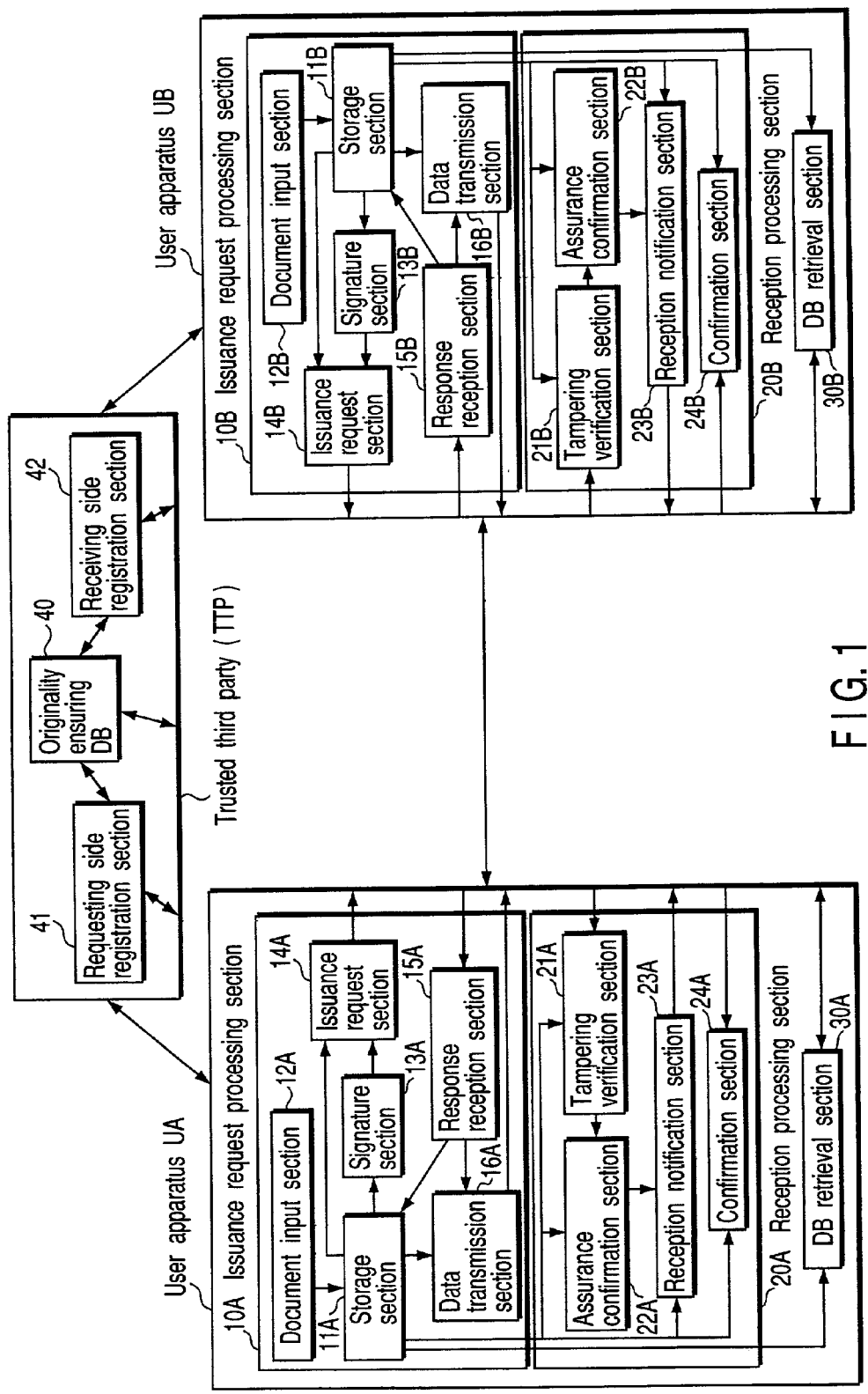
F I G. 1

| | | | |
|---|---|---|---|
| A | $P_A$ | $ADR_A$ | ftp |
| B | $P_B$ | $ADR_B$ | smtp |
| ⋮ | ⋮ | ⋮ | ⋮ |

| | | | |
|---|---|---|---|
| T | $P_{TTP}$ | $ADR_{TTP}$ | ftp |
| B | $P_B$ | $ADR_B$ | smtp |
| ⋮ | ⋮ | ⋮ | ⋮ |

| | | | |
|---|---|---|---|
| T | $P_{TTP}$ | $ADR_{TTP}$ | ftp |
| A | $P_A$ | $ADR_A$ | ftp |
| ⋮ | ⋮ | ⋮ | ⋮ |

F I G. 13A
F I G. 13B
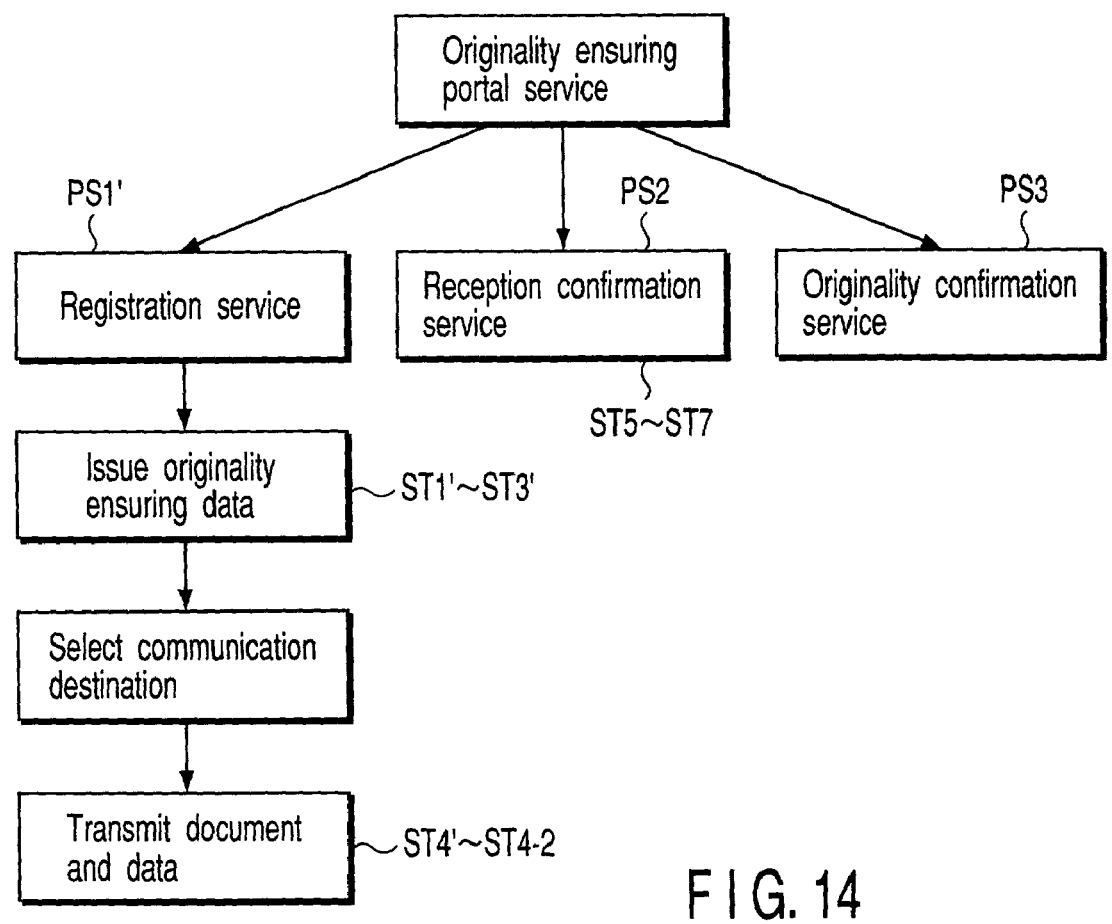
F I G. 14

SYSTEM, METHOD, AND PROGRAM FOR ENSURING ORIGINALITY

CROSS-REFERENCE TO THE RELATED APPLICATIONS

This application is based upon and claims the benefit of priority from the prior Japanese Patent Application No. 2000-356239, filed on Nov. 22, 2000, the entire contents of which are incorporated herein by reference.

BACKGROUND OF THE INVENTION

1. Field of the Invention

The present invention relates to a system, method, and program thereof which can ensure originality of documents via a trusted third party.

2. Description of the Related Art

Because it is difficult to ensure originality of electronic documents, services for exchanging electronic documents via the Internet are not widely used in fields that attach most importance to originality of electronic documents.

In recent years, however, as the originality ensuring technology is coming into realization along with development of encryption technologies, originality ensuring services provided with the originality ensuring technology are coming into widespread use.

As a basic technology, this type of originality ensuring services uses the system which allows a trusted third party (TTP) to ensure originality by transmitting an electronic document to the computer of the trusted third party (TTP). In the following specification, the trusted third party (TTP) does not mean an organization itself, but a computer such as a server apparatus etc. operated by the trusted third party (TTP).

However, this originality ensuring system exchanges electronic documents via the trusted third party (TTP). When the trusted third party (TTP) is congested with transmitted electronic documents, there is a problem that an overload is applied to the trusted third party (TTP) or a network connected to the trusted third party (TTP).

BRIEF SUMMARY OF THE INVENTION

It is an object of the present invention to provide a system, method, and program for ensuring originality, which can decrease loads on the trusted third party and associated networks.

A system for ensuring originality of electronic data according to a first aspect of the invention comprises: a third party apparatus which receives a first digital signature for the electronic data to return an originality ensuring digital signature generated for a set of the first digital signature and first date information to a transmission origin of the first digital signature and receives an undeniable digital signature for the first digital signature to save this undeniable digital signature as a set together with the first digital signature and the originality ensuring digital signature; a first entity apparatus which transmits the first digital signature to the third party apparatus and receives an originality ensuring digital signature from the third party apparatus to transmit a set of this originality ensuring digital signature, the electronic data, and the first digital signature; and a second entity apparatus which receives a set of the originality ensuring digital signature, the electronic data, and the first digital signature from the first entity apparatus, verifies the electronic data based on the originality ensuring digital signature and the first digital signature, and when a verification result is valid, transmits an undeniable digital signature generated for a set of the first digital signature and second date information to the third party apparatus.

Because of this, no electronic data is transmitted to the third party apparatus when ensuring the originality of electronic data. If the third party apparatus is congested with accesses, it is possible to decrease loads applied to the third party and associated networks.

Since there is registered an undeniable signature for the second entity apparatus, it is possible to prevent the second entity apparatus from denying the reception.

A computer program according to a second aspect of the invention relates to a third party apparatus providing an originality ensuring portal service which registers a set of a first digital signature of a first entity apparatus for electronic data, an originality ensuring digital signature generated from this first digital signature and first date information, and an undeniable digital signature of a second entity apparatus for the first digital signature, and ensures originality of the electronic data.

The computer program stored in a computer-readable storage medium used for the third party apparatus comprises: a first program code which provides an application program to the first and the second entity apparatuses registered to the third party in advance for using the originality ensuring portal service; a second program code which confirms, when accessed by the application program, confirms an access privilege of the accessing first entity apparatus or second entity apparatus by referencing the registered information about entities; and a third program code which permits the use of the originality ensuring portal service for an entity apparatus having the access privilege confirmed.

Consequently, it is possible to provide an originality ensuring system achieving effects equivalent to those for the first invention as a networked portal service.

A computer program according to a third aspect of the invention is stored in a computer-readable storage medium used for a third party apparatus managing a database which registers login information about users who use respective entity apparatuses, the computer program comprising: a first program code which, when a transmitting entity apparatus specifies a destination entity apparatus out of the respective entity apparatuses, references the database based on the specification; and a second program code which provides the destination entity apparatus with login information about the transmitting entity apparatus as a result of the reference.

Consequently, it is possible to decrease maintaining costs for managing login information between entity apparatuses.

A computer program according to a fourth aspect of the invention relates to an originality ensuring system which applies an originality ensuring digital signature of a third party apparatus to a first digital signature provided to electronic data by a first entity apparatus and accordingly ensures originality of the electronic data for a second entity apparatus, the computer program stored in a computer-readable storage medium used for the third party apparatus managing a database for registering login information about respective entity apparatuses comprising: a first program code which receives an issuance request including the first digital signature, receives specification of a destination second entity apparatus from the first entity apparatus, and then generates the originality ensuring digital signature based on the issuance request; a second program code which registers the generated originality ensuring digital signature in association with the first digital signature; a third program code which references the database based on the specification and provides the destination second entity apparatus with login information about the first entity apparatus; a fourth program code which transmits the registered originality ensuring digital signature and the provided login information to the first entity apparatus; a fifth program code which receives a reception notification including an undeniable digital signature supplied to the first digital signature from the second entity apparatus and then registers this undeniable digital signature in association with the originality ensuring digital signature and the first digital signature; and a sixth program code which returns to the second entity apparatus the reception confirmation including identification information and the undeniable digital signature for retrieving the registered undeniable digital signature, the originality ensuring digital signature, and the first digital signature.

Consequently, it is possible to concurrently provide effects of the first and third aspects of the present invention.

A computer program according to a fifth aspect of the invention is stored in a computer-readable storage medium used for the third party apparatus which provides an originality ensuring portal service for registering a set of a first digital signature of a first entity apparatus for electronic data, an originality ensuring digital signature generated from this first digital signature and first date information, and an undeniable digital signature of a second entity apparatus for the first digital signature to ensure originality of the electronic data and manages a database registering login information about respective entity apparatuses including the first and second entity apparatuses, the computer program comprising: a first program code which provides respective entity user previously registered to the database with an application program for using the originality ensuring portal service; a second program code which confirms, when accessed by the application program, confirms an access privilege of the accessing from first entity apparatus or second entity apparatus by referencing the setting; a third program code which permits the use of the originality ensuring portal service for an entity apparatus having the access privilege confirmed; a fourth program code which, when a transmitting first entity apparatus specifies a destination second entity apparatus out of the respective entity apparatuses, references the database based on the specification; and a fifth program code which provides the destination second entity apparatus with login information about the transmitting first entity apparatus as a result of the reference.

Consequently, it is possible to concurrently provide effects of the second and third aspects of the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic diagram showing the configuration of an originality ensuring system according to a first embodiment of the present invention;

FIG. 5 is a schematic diagram showing a table content on the third party side according to the second embodiment;

FIG. 6A is a schematic diagram showing a table content on the first user apparatus side according to the second embodiment;

FIG. 6B is a schematic diagram showing a table content on the second user apparatus side according to the second embodiment;

FIG. 13A is a schematic diagram showing a table content on the first user apparatus side according to the fourth embodiment;

FIG. 13B is a schematic diagram showing a table content on the second user apparatus side according to the fourth embodiment; and FIG. 14 is a schematic diagram showing operations according to the fourth embodiment.

DETAILED DESCRIPTION OF THE INVENTION

Figure 2A:
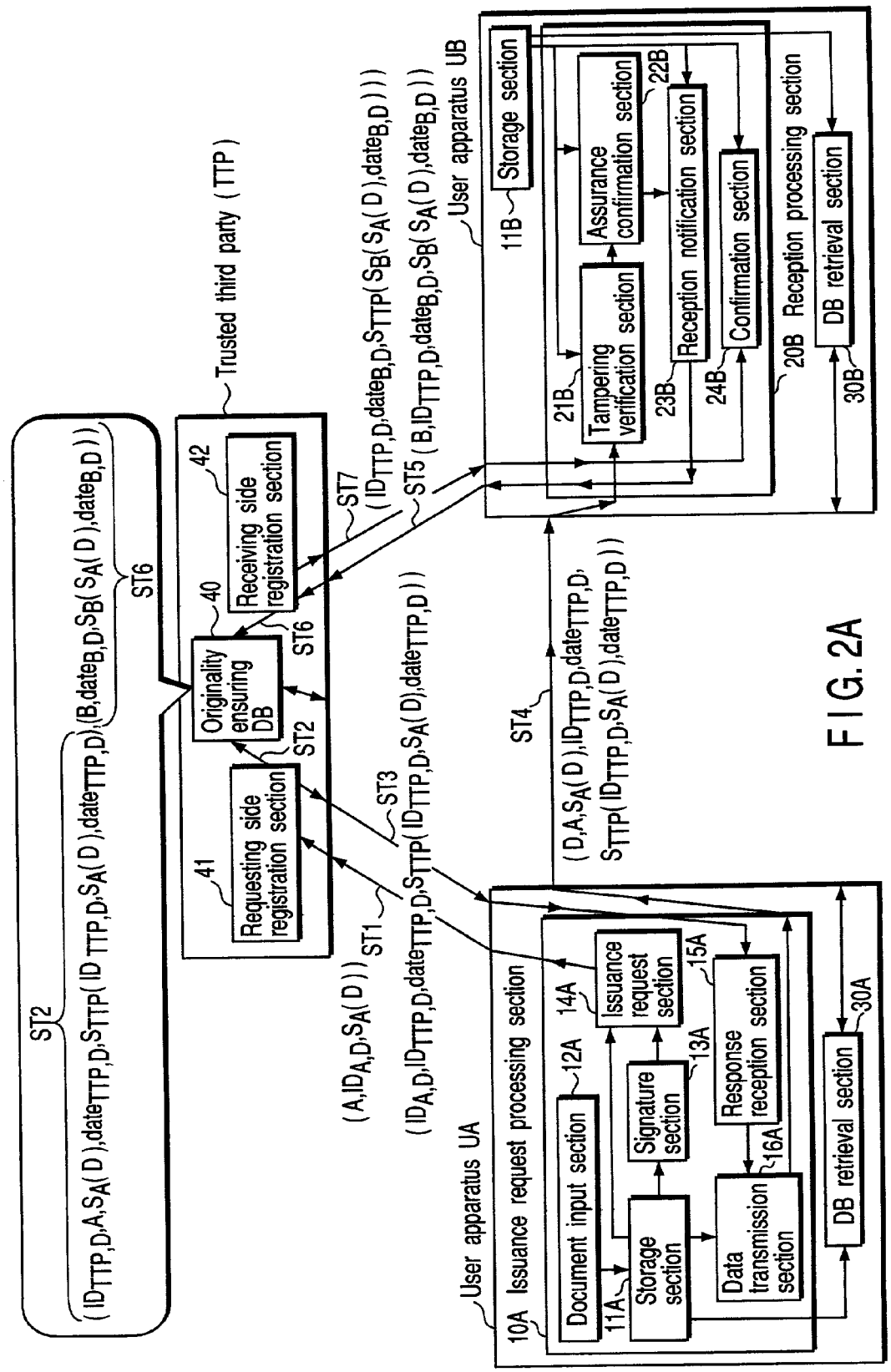
FIG. 2A is a schematic diagram showing operations of the originality ensuring system according to the first embodiment.

Embodiments of the present invention will be described in further detail with reference to the accompanying drawings. All the following embodiments are based on the public key cryptographic technology. It is assumed that a first user apparatus UA, a second user apparatus UB, and the trusted third party (TTP) have their own particular public key pairs and public key certificates. In the first and second embodiments, it is assumed that the first user apparatus UA, the second user apparatus UB, and the trusted third party (TTP) also have the others' public key certificates. It may be preferable to improve the security of the communication among apparatuses TTP, UA, and UB by using the cryptographic technology or the digital signature technology.

FIRST EMBODIMENT

FIG. 1 is a schematic diagram showing the configuration of an originality ensuring system according to a first embodiment of the present invention. This originality ensuring system comprises the first user apparatus UA, the second user apparatus UB, and the trusted third party (TTP). There are two or more first and second user apparatuses UA and UB in total. FIG. 1 shows two apparatuses, one UA and one UB, randomly selected from any number of these apparatuses. The first and second user apparatus UA and UB exemplify first and second entity apparatuses. Other examples of entity apparatuses include those used for enterprises and government and other public offices.

Since the first and second user apparatuses UA and UB have the same configuration, the description uses the first user apparatus UA or the second user apparatus UB as an example. The description of the user apparatus UA applies to that of the user apparatus UB by replacing suffix A with B, and vice versa. i.e. elements 12B–16B are similar to elements 12A–16A and elements 21B–24B are similar to elements 21A–24A.

The user apparatus UA comprises an issuance request processing section 10A, a reception processing section 20A, and a DB retrieval section 30A. The issuance request processing section 10A is responsible for an issuance request and transmission of its result to the third party apparatus TTP. The reception processing section 20A is responsible for reception from the other user apparatus UB and its notification. The DB retrieval section 30A is responsible for retrieval of the third party apparatus TTP. Hardware and/or software can be used for implementing the sections 10A to 30A in the user apparatus UA. When the software is used, the user apparatus UA is configured to install a program for implementing features of the sections 10A to 30A from, e.g., a storage medium or a network.

The issuance request processing section 10A includes a storage section 11A, a document input section 12A, a signature section 13A, an issuance request section 14A, a response reception section 15A, and a data transmission section 16A.

The storage section 11A stores identification information A about the user of the local apparatus UA, a public key pair and a public key certificate for the local apparatus UA, public key certificates for the remote apparatus UP and TTP, an electronic document D entered from the document input section 12, identification information $ID_{A,D}$ about the electronic document, a digital signature $S_A(D)$ created in the signature section 13, and identification information $ID_{TTP,D}$, a registration date $date_{TTP,D}$, and a digital signature $S_{TTP}(ID_{TTP,D}, S_A(D), date_{TTP,D})$ created in the third party apparatus TTP.

Suffix A indicates that the storage content is created by the user apparatus UA. Examples are $ID_{A,D}$ and $S_A(D)$. Suffix TTP indicates that the storage content is created by the trusted third party (TTP). Examples are $ID_{TTP,D}$, $date_{TTP,D}$, $S_{TTP}$, and so on. Suffix D indicates the corresponding electronic document D. Examples are $ID_{A,D}$ or $ID_{TTP,D}$. Electronic document D as electronic data is not limited to electronic document data as text only comprising character strings. It may be preferable to use a document including numeric, tables, image data, or combination of these. It is possible to use any data format and any amount of data. For example, a document can contain voice data and comprise a small amount of data.

The document input section 12A has functions which allow operator's operations to create, modify, or edit electronic document D, and write the resulting electronic document D to the storage section 11A.

The signature section 13A has features which allow operator's operations to generate digital signature $S_A(D)$ for a relevant electronic document D in the storage section 11A by using a hash function and own particular secret key and to write the generated digital signature $S_A(D)$ to the storage section 11A.

The issuance request section 14A has features to create an issuance request for originality ensuring data based on the content of the storage section 11A and to transmit this issuance request to the trusted third party (TTP).

For example, the issuance request includes requester information A indicating a requesting origin (user A on apparatus UA), a digital signature $S_A(D)$ generated by the user apparatus UA for electronic document D, and identification information $ID_{A,D}$ for electronic document D in the user apparatus UA. Namely, the issuance request is data comprising $\{A, S_A(D), ID_{A,D}\}$. Though identification information $ID_{A,D}$ is omissible, it is desirable to use this information from the viewpoint of efficiency improvement.

The response reception section 15A has features to verify response data from the trusted third party (TTP) based on a public key certificate of the trusted third party (TTP), to write the response data to the storage section 11A when the response data is valid and to control the data transmission section 16A when a transmission destination is specified beforehand.

The data transmission section 16A has a feature which allows operator's operations or control from the response reception section 15A to reference the storage section 11A and to transmit ensured data $\{D, A, S_A(D), ID_{TTP,D}, date_{TTP,D}, S_{TTP}(ID_{TTP,D}, S_A(D), date_{TTP,D})\}$ to the user apparatus UB. The ensured data contains electronic document D specified by identification information $ID_{A,D}$ and data (requesting side registration data) formed by excluding $ID_{A,D}$ from response data and adding A and $S_A(D)$.

The following describes the reception processing sections 20A and 20B. The description to follow covers operations of the reception processing section 20B for the user apparatus UB. To avoid confusion, the explanation here presents the reception processing section 20B for the user apparatus UB as an example.

The reception processing section 20B for the user apparatus UB includes a tampering verification section 21B, an assurance confirmation section 22B, a reception notification section 23B, and a confirmation section 24B.

The tampering verification section 21B has the following feature. When receiving ensured data from the other user apparatus UA, the tampering verification section 21B verifies whether electronic document D is tampered by using a public key certificate for identification information A in the ensured data and by using digital signature $S_A(D)$.

The assurance confirmation section 22B has the following feature. When the electronic document D is not tampered as a result of the verification by the tampering verification section 21B, the assurance confirmation section 22B decrypts originality ensuring data $S_{TTP}(ID_{TTP,D}, S_A(D), date_{TTP,D})$ by using the public key certificate for the trusted third party (TTP) in the storage section 11B. By comparing a decryption result with the hash value for the concatenated data $S_A(D)$, $ID_{TTP,D}$, and $date_{TTP,D}$, the assurance confirmation section 22B confirms that the trusted third party (TTP) ensures the originality. It may be preferable to confirm the originality assurance before verifying whether the document is tampered.

The reception notification section 23B has the following feature. The reception notification section 23B creates a reception notification for preventing reception denial after verification of no tampering by the tampering verification section 21B and confirmation of the originality assurance by the assurance confirmation section 22B. The reception notification section 23B transmits this reception notification {B, $ID_{TTP,D}$, $date_{B,D}$, $S_B(S_A(D), date_{B,D})$} to the trusted third party (TTP).

For example, the reception notification includes identification information B of the recipient (user apparatus UB), identification information $ID_{TTP,D}$, reception date $date_{B,D}$ on the user apparatus UB, and information $S_B(S_A(D), date_{B,D})$. The identification information $ID_{TTP,D}$ is supplied to electronic document D by the trusted third party (TTP). The information $S_B(S_A(D), date_{B,D})$ is used for ensuring reception on the user using apparatus UB or for preventing reception denial.

The confirmation section 24B has the following feature. When receiving a reception confirmation from the trusted third party (TTP), the confirmation section 24B retrieves electronic document D received from the user apparatus UA by using $ID_{TTP,D}$ as a key. The confirmation section 24B then confirms that the trusted third party (TTP) has successfully processed the reception notification.

For example, the reception confirmation includes identification information $ID_{TTP,D}$, reception date $date_{B,D}$ on B from A, and information $S_{TTP}(S_B(S_A(D), date_{B,D}), date_{B,D})$. Identification information $ID_{TTP,D}$ is supplied to electronic document D by the trusted third party (TTP). Information $S_{TTP}(S_B(S_A(D), date_{B,D}), date_{B,D})$ is used for certifying the reception notification from the user apparatus UB. Date $date_{B,D}$ is omissible when the user apparatus UB saves the data.

The DB retrieval section 30A has the feature which allows operator's operations to retrieve originality ensuring DB (database) 40 of the trusted third party (TTP) by using identification information $ID_{TTP,D}$ as a key and to acquire its registered content.

The trusted third party (TTP) includes an originality ensuring DB 40, a requesting side registration section 41, and a receiving side registration section 42. Hardware and/or software can be used for implementing the sections 41 and 42 in the trusted third party (TTP). When the software is used, the trusted third party (TTP) is configured to install a program for implementing features of the sections 41 and 42 as mentioned above.

In the originality ensuring DB 40, the requesting side registration section 41 and the receiving side registration section 42 register requesting side registration data {$ID_{TTP,D}$, A, $S_A(D)$, $date_{TTP,D}$, $S_{TTP}(ID_{TTP,D}, S_A(D), date_{TTP,D})$} and receiving side registration data {B, $date_{B,D}$, $S_B(S_A(D), date_{B,D})$} by using identification information $ID_{TTP,D}$ as a key. The DB retrieval sections 30A and 30B in the user apparatuses UA and UB can retrieve registered contents.

The requesting side registration section 41 has the following features. When receiving an issuance request from the user apparatus UA, the requesting side registration section 41 creates requesting side registration data {$ID_{TTP,D}$, A, $S_A(D)$, $date_{TTP,D}$, $S_{TTP}(ID_{TTP,D}, S_A(D), date_{TTP,D})$} based on the received issuance request. The requesting side registration section 41 registers the created requesting side registration data to the originality ensuring DB. The requesting side registration section 41 sends response data {$ID_{A,D}$, $ID_{TTP,D}$, $date_{TTP,D}$, $S_{TTP}(ID_{TTP,D}, S_A(D), date_{TTP,D})$} to the user apparatus UA. This response data is created by excluding A and $S_A(D)$ from the registered requesting side registration data and adding $ID_{TTP,D}$.

Here, the requesting side registration data includes, e.g., identification information $ID_{TTP,D}$ for electronic document D in the trusted third party (TTP), identification information A of the requester (user apparatus UA), digital signature $S_A(D)$ by the requester, $date_{TTP,D}$ of originality assurance processed by the trusted third party (TTP), and originality ensuring data $S_{TTP}(ID_{TTP,D}, S_A(D), date_{TTP,D})$. The trusted third party (TTP) uses the originality ensuring data as a digital signature for connected data of $ID_{TTP,D}$, $S_A(D)$, $date_{TTP,D}$. Namely, the requesting side registration data is {$ID_{TTP,D}$, A, $S_A(D)$, $date_{TTP,D}$, $S_{TTP}(ID_{TTP,D}, S_A(D), date_{TTP,D})$}.

The receiving side registration section 42 has the following features. When receiving a reception notification from the user apparatus UB, the receiving side registration section 42 additionally registers receiving side registration data {B, $date_{B,D}$, $S_B(S_A(D), date_{B,D})$} to the originality ensuring DB 40 corresponding to identification information $ID_{TTP,D}$ based on that reception notification and $ID_{TTP,D}$ in the originality ensuring DB 40. After this registration, the receiving side registration section 42 sends reception confirmation {$ID_{TTP,D}$, $date_{B,D}$, $S_{TTP}(S_B(S_A(D), date_{B,D}))$} to the user apparatus UB.

Figure 3:
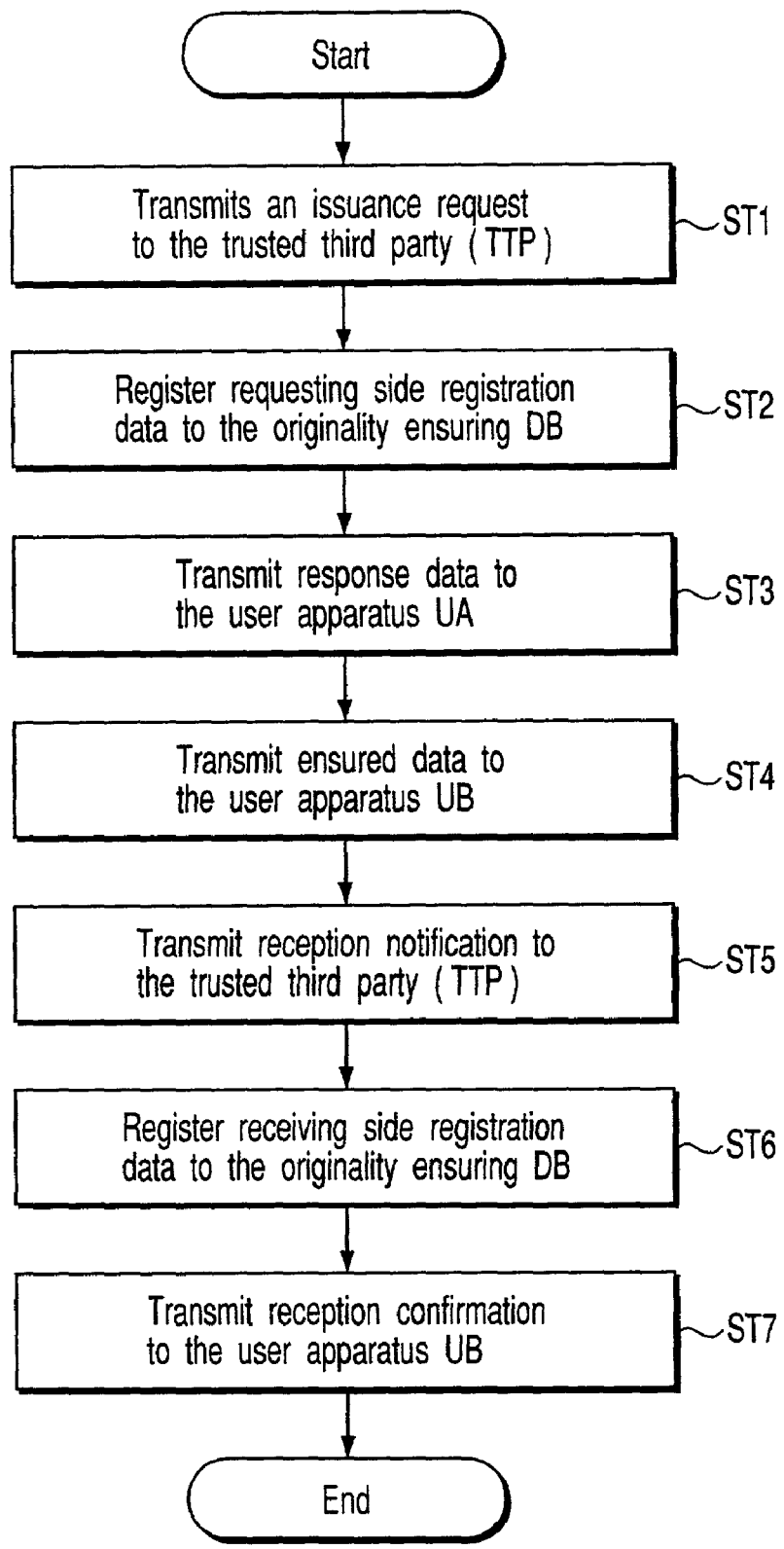
FIG. 3 is a flowchart explaining operations in the first embodiment.

The following describes operations of the thus configured originality ensuring system by using the schematic diagram in FIG. 2A and the flowchart in FIG. 3. The schematic diagram in FIG. 2A shows functional blocks just needed for the user apparatuses UA and UB when the user apparatus UA is assumed to be the sending side and the user apparatus UB is assumed to be the receiving side. FIG. 2A omits the reception processing section 20A for the sending side and the issuance request processing section 10B for the receiving side. Further, FIG. 2A omits the description of login processing which is needed between the user apparatuses UA and UB before data transmission.

In the user apparatus UA, suppose that the document input section 12A allows an operator's operation to create, modify, or edit electronic document D, and write the resulting electronic document D to the storage section 11A.

When the electronic document D requires originality assurance, the user apparatus UA allows an operator's operation to initiate the signature section 13A before transmitting the electronic document D to the user apparatus UB.

The signature section 13A generates digital signature $S_A(D)$ by using a hash function and own particular secret key for relevant electronic document D in the storage section 11A. The signature section 13A then writes this digital signature $S_A(D)$ to the storage section 11A.

Based on the content of the storage section 11A, the issuance request section 14A creates issuance request {A, $S_A(D)$, $ID_{A,D}$} for the originality ensuring data of electronic document D. The storage section 11A transmits the resulting issuance request to the trusted third party (TTP) (ST1).

When the trusted third party (TTP) receives the issuance request, the requesting side registration section 41 creates requesting side registration data {$ID_{TTP,D}$, A, $S_A(D)$, $date_{TTP,D}$, $S_{TTP}(ID_{TTP,D}, S_A(D), date_{TTP,D})$} based on the received issuance request. The requesting side registration section 41 registers the resulting requesting side registration data to the originality ensuring DB 40 (ST2).

The requesting side registration section 41 then transmits response data {$ID_{A,D}$, $ID_{TTP,D}$, $date_{TTP,D}$, $S_{TTP}(ID_{TTP,D}, S_A(D), date_{TTP,D})$} to the user apparatus UA by excluding A and $S_A(D)$ from the requesting side registration data and adding $ID_{A,D}$ (ST3). The response data may use $S_A(D)$ instead of $ID_{A,D}$.

When the user apparatus UA receives the response data, the response reception section 15A writes the received response data to the storage section 11A. According to an operator's operation or control from the response reception section 15A, the data transmission section 16A references the storage section 11A. Then, the data transmission section 16A transmits ensured data {D, A, $S_A(D)$, $ID_{TTP,D}$, $date_{TTP,D}$, $S_{TTP}(ID_{TTP,D}, S_A(D), date_{TTP,D})$} to the user apparatus UB (ST4). The ensured data includes electronic document D specified by identification information $ID_{A,D}$ and requesting side registration data created by excluding $ID_{A,D}$ from the response data and adding A and $S_A(D)$. The electronic document D may be encrypted as needed.

When the user apparatus UB receives the ensured data, the tampering verification section 21B verifies whether electronic document D is tampered by using the public key certificate corresponding to identification information A in the ensured data and by using digital signature $S_A(D)$.

When electronic document D is not tampered, the assurance confirmation section 22B in the user apparatus UB decrypts originality ensuring data $S_{TTP}(ID_{TTP,D}, S_A(D), date_{TTP,D})$ by using the public key certificate for the trusted third party (TTP). The decryption result is compared with the hash value for the concatenated data $S_A(D)$, $ID_{TTP,D}$, $date_{TTP,D}$ to confirm that the trusted third party (TTP) ensures the originality.

After confirming the originality assurance, the reception notification section 23B in the user apparatus UB creates a reception notification for the prevention of reception denial. The reception notification section 23B transmits this reception notification {B, $ID_{TTP,D}$, $date_{B,D}$, $SB(S_A(D), date_{B,D})$} to the trusted third party (TTP) (ST5).

When the trusted third party (TTP) receives the reception notification, the receiving side registration section 42 additionally registers receiving side registration data {B, $date_{B,D}$, $S_B(S_A(D), date_{B,D})$} to the originality ensuring DB 40 corresponding to identification information $ID_{TTP,D}$ based on $ID_{TTP,D}$ in the originality ensuring DB (ST6). Furthermore, Thereafter, in the trusted third party (TTP), the receiving side registration section 42 transmits reception confirmation {$ID_{TTP,D}$, $date_{B,D}$, $S_{TTP}(S_B(D), date_{B,D})$} to the user apparatus UB (ST7).

Figure 2B:
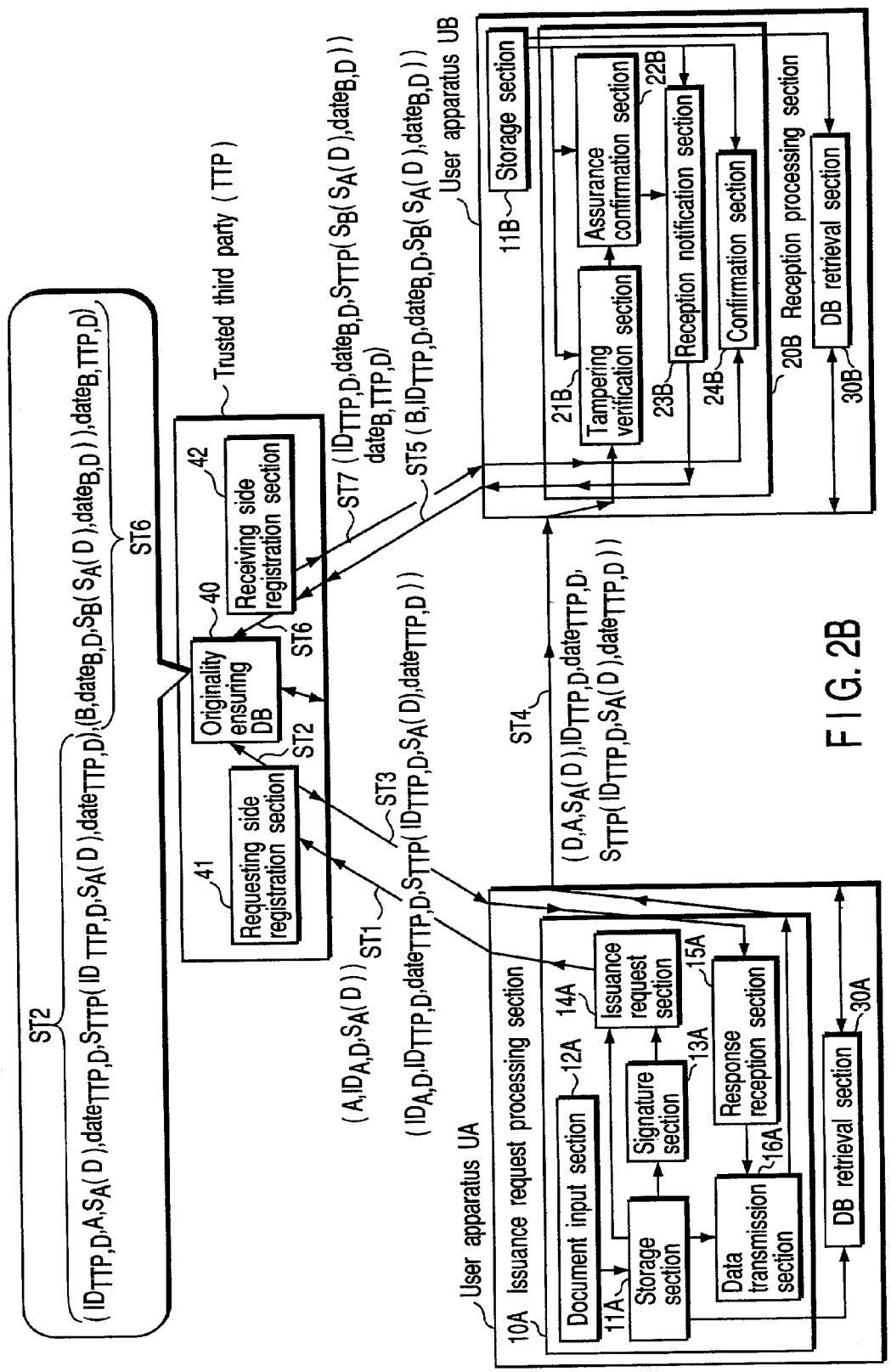
FIG. 2B is a schematic diagram showing modified operations of the originality ensuring system according to the first embodiment.

Furthermore, the receiving side registration data of ST6 and the reception confirmation of ST7 may include reception date $date_{B,TTP,D}$ on TTP from B, shown in FIG. 2B. The $date_{B,TTP,D}$ means the date when TTP receives the reception notification {B, $ID_{TTP,D}$, $date_{B,D}$, $S_B(S_A(D), date_{B,D})$}.

Either way, when the user apparatus UB receives the reception confirmation, the confirmation section 24B retrieves the electronic document D received from the user apparatus UA by using $ID_{TTP,D}$ as a key, confirming that the trusted third party (TTP) has correctly processed the reception notification.

There has been completed processing for ensuring the originality of electronic document D and preventing reception denial in the user apparatus UA for the user apparatus UB.

When the user apparatus UA needs to confirm reception by the user apparatus UB, the DB retrieval section 30A in the user apparatus UA retrieves the originality ensuring DB 40 according to $ID_{TTP,D}$ as a key, e.g., by using a WWW technology based service provided by the trusted third party (TTP). This enables to confirm the originality assurance and/or the reception.

Subsequently, it may be preferable to change the roles of the user apparatuses UA and UB. In this case, with regard to electronic document D' created by the user apparatus UB, it is possible to ensure the originality of electronic document D' and prevent reception denial for the user apparatus UA in the same manner as mentioned above. Namely, when the first and second user apparatuses UA and UB perform transaction etc. by exchanging electronic documents, it may be preferable to ensure the document originality and prevent the reception denial by alternating the roles of UA and UB each time an electronic document is exchanged.

As mentioned above, when ensuring the originality of electronic document D, this embodiment does not transmit electronic document D to the trusted third party (TTP), but transmits a digital signature which has less information than electronic document D. When the trusted third party (TTP) is congested with accesses, it is possible to decrease loads applied to the trusted third party (TTP) or associated networks.

The originality ensuring DB 40 registers requesting side registration data and receiving side registration data. Because of this, the DB retrieval sections 30A and 30B can confirm the registered content of the originality ensuring DB 40 later (after ST7) or in the middle (e.g., between ST4 and ST5) as needed.

Further, this confirmation can provide some verification. For example, it is possible to verify whether the user apparatus UA causes a processing delay by checking a difference between registration date $date_{TTP,D}$ and reception date $date_{B,D}$ (or $date_{B,TTP,D}$).

SECOND EMBODIMENT

Figure 4:
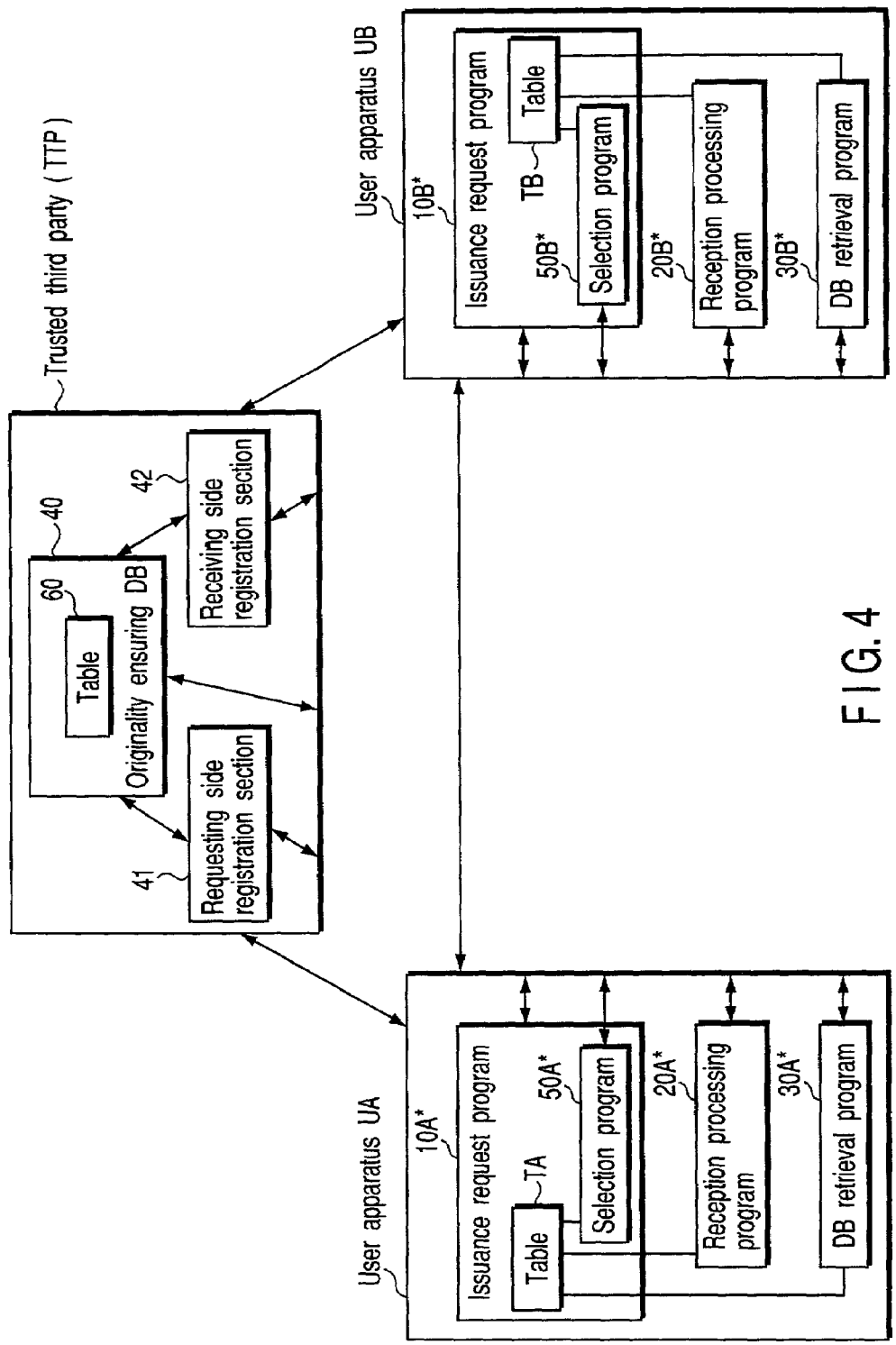
FIG. 4 is a schematic diagram showing the configuration of an originality ensuring portal service according to a second embodiment of the present invention.

FIG. 4 is a schematic diagram showing the configuration of an originality ensuring portal service according to a second embodiment of the present invention. According to this originality ensuring portal service, the trusted third party (TTP) provides the user apparatuses UA and UB with a program for implementing the functions of the first embodiment by contract and enables program execution.

Programs supplied to the user apparatuses UA and UB include issuance request programs 10A* and 10B*, reception processing programs 20A* and 20B*, DB retrieval programs 30A* and 30B*, and selection programs 50A* and 50B*. The programs 10A*, 10B*, 20A*, 20B*, 30A*, and 30B* implement the functions of the above-mentioned issuance request processing sections 10A and 10B, the reception processing sections 20A and 20B, and the DB retrieval sections 30A and 30B. The programs 50A* and 50B* implement selection of transmission destinations. The selection programs 50A* and 50B* are installed in the programs 10A* and 10B* associated with the issuance request processing sections 10A and 10B.

At the contract, it is premised that the user apparatuses UA and UB of each contractor provide the trusted third party (TTP) with identification information A and B, public key certificates $P_A$ and $P_B$, address information $ADR_A$ and $ADR_B$, and data communication protocols (e.g., smtp, http(s), ftp(s)) of the local apparatuses UA and UB.

As shown in FIG. 5, the trusted third party (TTP) stores the provided information in a table 60 for each of the user apparatuses UA and UB. Upon request by the user apparatuses UA and UB, the trusted third party (TTP) provides the requesting user apparatuses UA and UB with contents of the table 60 as a list of contractors.

After the contract, it is premised that the user apparatuses UA and UB as client apparatuses are ready for logging in to the trusted third party (TTP) as a server apparatus so as to be capable of receiving documents and data from other user apparatuses UA and UB.

Namely, after the contract, the user apparatuses UA and UB maintain at least trusted third party's (TTP's) identification information T, public key certificate PTTP, address information $ADR_{TTP}$, and data communication protocols in tables TA and TB as shown in FIGS. 6A and 6B. In addition, the tables TA and TB store identification information B and A, public key certificates $P_B$ and $P_A$, address information $ADR_B$ and $ADR_A$, and data communication protocols of the other user apparatuses UB and UA if needed.

The trusted third party (TTP) is ready for confirming access privileges for the user or user apparatuses UA and UB by referencing the table 60. The trusted third party (TTP) has the feature of permitting the user apparatus with access privilege confirmed to use the originality ensuring portal service.

The following describes operations of the thus configured originality ensuring portal service.

Figures 7, 9:
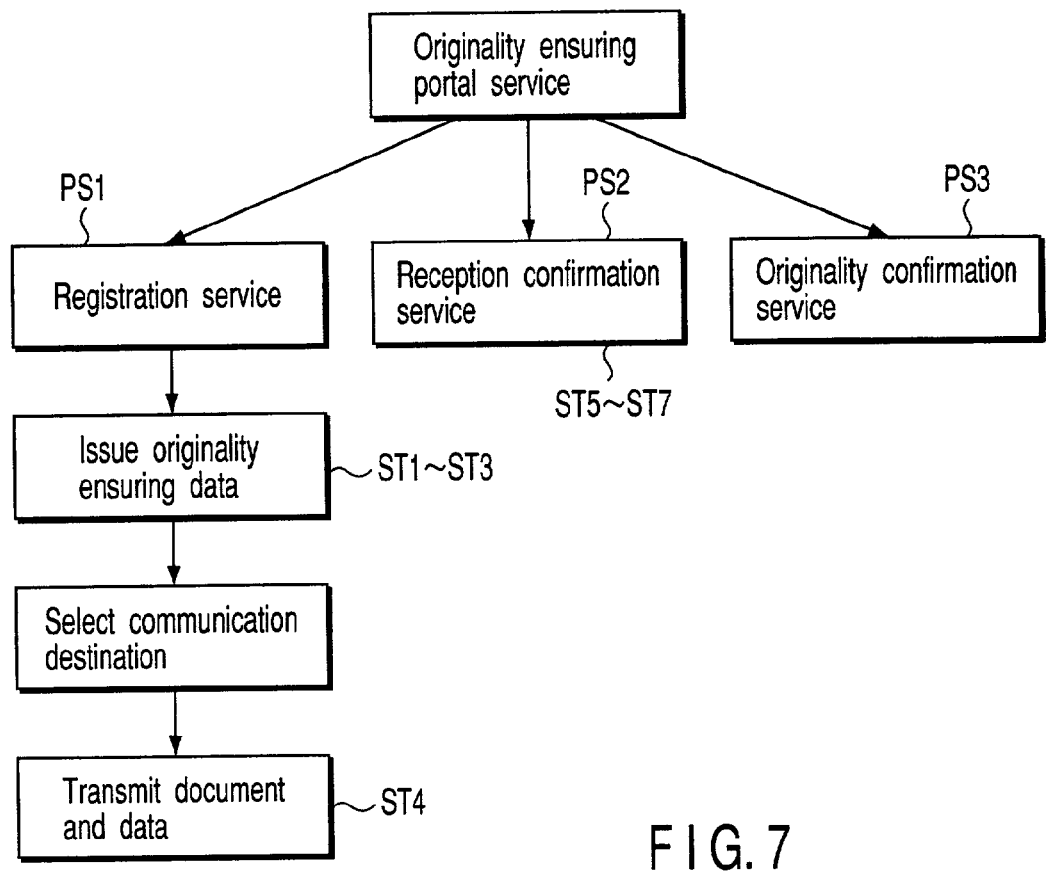
FIG. 7 is a schematic diagram showing operations according to the second embodiment.
FIG. 9 is a schematic diagram showing a table content on the third party side according to the third embodiment.

As shown in FIG. 7, the originality ensuring portal service can request to selectively execute a registration service PS1, a reception confirmation service PS2, and an originality confirmation service PS3 for the trusted third party (TTP). The registration service PS1 corresponds to the above-mentioned steps ST1 to ST4. The reception confirmation service PS2 corresponds to the above-mentioned steps ST5 to ST7. The originality confirmation service PS3 corresponds to the above-mentioned DB retrieval by the DB retrieval sections 30A and 30B. Each service is performed after the trusted third party (TTP) references the table 60 and confirms an access privilege of the user or user apparatus which is requested for execution.

For example, when the user apparatus UA selects the registration service PS1, the trusted third party (TTP) confirms an access privilege to permit the use of the registration service PS1. Thereafter, a process equivalent to the above-mentioned steps ST1 to ST3 is performed between the user apparatus UA and the trusted third party (TTP). After this process is complete, the user apparatus UA starts the transmission destination selection program 50A* to select transmission destinations.

Along with this selection process, the user apparatus UA requests the trusted third party (TTP) for a list of contractors registered to the table 60. Based on a response, the user apparatus UA displays a list of contractors (e.g., enterprises and individuals) under contract to the trusted third party (TTP).

When an operator of the user apparatus UA selects a contractor in the list as a transmission destination, a specified data communication protocol is initiated for the destination user apparatus UB, enabling transmission to the user apparatus UB.

For example, when the data communication protocol is smtp, a mail client starts to fill a transmission destination address with the user or user apparatus UB address. When the data communication protocol is http(s), the user apparatus UA displays a homepage of the transmission destination user apparatus UB. When the data communication protocol is ftp(s), an ftp(s) client starts and is connected to the transmission destination user apparatus UB.

The user apparatus UA creates ensured data to be transmitted at the above-mentioned step ST4 and transmits the ensured data to the user apparatus UB according to the data communication protocol. This completes the registration service PS1.

When the receiving user apparatus UB selects the reception confirmation service PS2, the trusted third party (TTP) confirms an access privilege. Thereafter, the user apparatus UB automatically performs a process equivalent to the above-mentioned steps ST5 to ST7 in cooperation with the trusted third party (TTP). After the automatic process, the reception confirmation service PS2 is complete.

Like the first embodiment, this can ensure the originality and prevent the reception denial.

When the user on apparatus UA selects the originality confirmation service PS3, the trusted third party (TTP) confirms an access privilege. Thereafter, the user apparatus UA provides the trusted third party (TTP) with identification information $ID_{TTP,D}$ for electronic document D. The user apparatus UA then acquires ensured data $\{D, A, S_A(D), ID_{TTP,D}, date_{TTP,D}, S_{TTP}(ID_{TTP,D}, S_A(D), date_{TTP,D})\}$ from the originality ensuring DB 40 and confirms the originality of electronic document D based on the ensured data. This completes the originality confirmation service PS3. In addition, from a point of view in confirmation of the effect received surely, "$S_B(S_A(D), date_{B,D})$" is based on, and receipt confirmation service can be done.

In addition, user apparatus UA acquires ensured data, and digital signature $S_A(D)$ may be ordered, and besides, user apparatus UA may acquire the public key certificate of A at a point in time when A signed.

At validation, case when public key certificate $P_A$ of A lapses or originally do not have public key certificate $P_A$ gets possible to execute a process then.

In addition, because, about the trusted third party (TTP), there is the case that public key certificate $P_{TTP}$ of TTP is lapsed, new public key certificate $P_{TTP}$ of TTP may be transmitted.

As mentioned above, this embodiment can provide the originality assurance service having effects equivalent to those of the first embodiment as a networked portal service. When an originality-ensured electronic document is transmitted, it is possible to easily select transmission destinations.

THIRD EMBODIMENT

Figure 8:
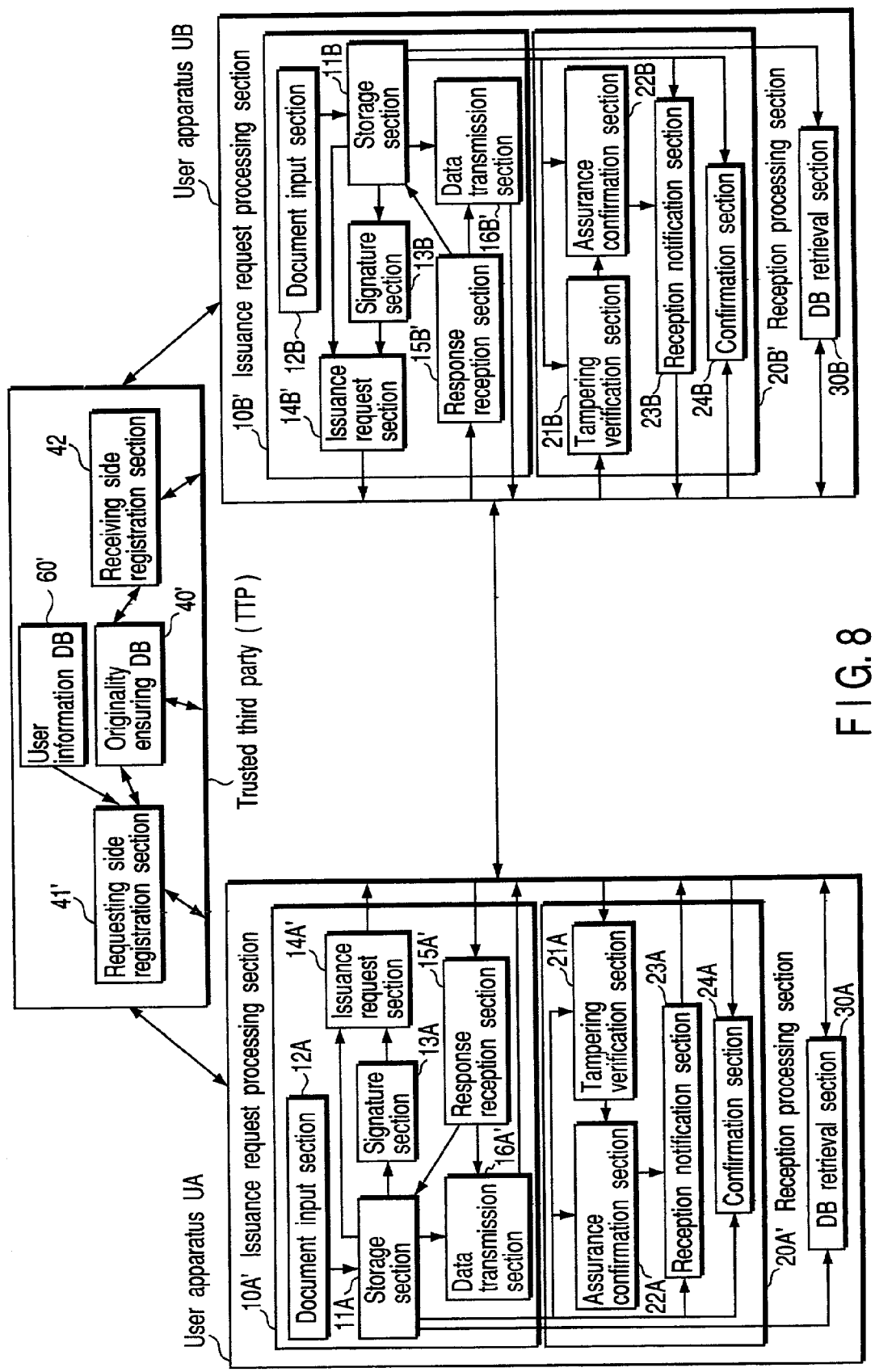
FIG. 8 is a schematic diagram showing the configuration of an originality ensuring system according to a third embodiment of the present invention.

FIG. 8 is a schematic diagram showing the configuration of an originality ensuring system according to a third embodiment of the present invention. The same elements when shown in the above-mentioned figures are designated by the same reference numerals. A modified element is marked with a prime ('). The following chiefly describes modified elements. Duplicate descriptions are also omitted from the following embodiment.

This embodiment is a modification of the first embodiment. The following conditions apply. Namely, each of the user apparatuses UA and UB does not have the counterpart's public key certificate. The trusted third party (TTP) maintains information about all the user apparatuses UA and UB as shown in FIG. 5. Each of the user apparatuses UA and UB does not have information about the counterpart as shown in FIGS. 6A and 6B.

Specifically, this embodiment enables the transmitting user apparatus UA to log in by allowing the trusted third party (TTP) to transmit login information about the transmitting user on apparatus UA to the destination user apparatus UB. In this case, the destination user apparatus UB does not need to await information about the sending user apparatus UA.

Here, the trusted third party (TTP) includes elements 40' and 41' having the login feature corresponding to the above-mentioned elements 40 and 41.

In addition, the trusted third party (TTP) includes a user information DB 60', as shown in FIG. 9. The user information DB 60' registers identification information A and B, public key certificates $P_A$ and $P_B$, address information $ADR_A$ and $ADR_B$, authentication information $Auth_A$ and $Auth_B$, and communication protocols ftp and smtp for each of the user apparatuses UA and UB. The above-mentioned login information means a set of identification information A and authentication information $Auth_A$. Authentication information $Auth_A$ allows the use of a password, temporary key data, etc.

In addition to the above-mentioned features, the requesting side registration section 41' has the following features. Namely, this section transmits login information $\{A, Auth_A\}$ and public key certificate $P_A$ for the transmitting user on apparatus UA to the destination user apparatus UB from the registered requesting side registration data. Further, the section transmits login information together with the above-mentioned response data to the user apparatus UA.

In a way similar to the above, the following describes features of the user apparatuses UA and UB.

The user apparatus UA includes sections 10A' and 20A' having the login feature corresponding to the above-mentioned elements 10 and 20.

The issuance request processing section 10A' includes sections 14A' to 16A' having the login feature corresponding to the above-mentioned elements 14A to 16A.

In addition to the above-mentioned features, the issuance request section 14A' has the feature of transmitting destination specification together with an issuance request to the trusted third party (TTP).

In addition to the above-mentioned features, the response reception section 15A' has the feature of writing login information and response data from the trusted third party (TTP) to the storage section 11A.

In addition to the above-mentioned features, the data transmission section 16A' has the feature of transmitting login information together with the ensured data to the destination user apparatus UB.

In addition to the above-mentioned features, the reception processing section 20B' for the user apparatus UB has the following features. Namely, this section registers login information received from the trusted third party (TTP) to the storage section 11B. Further, the section performs login processing based on login information received from the user apparatus UA. Furthermore, the section deletes login information from the storage section 11B after login processing and during a period after completion of the verification by the tampering verification section 21B and before transmission of a reception notification by the reception notification section 23B.

The description of the user apparatus UA or UB also applies to the counterpart by changing the suffix A to B, or vice versa.

Figure 10A:
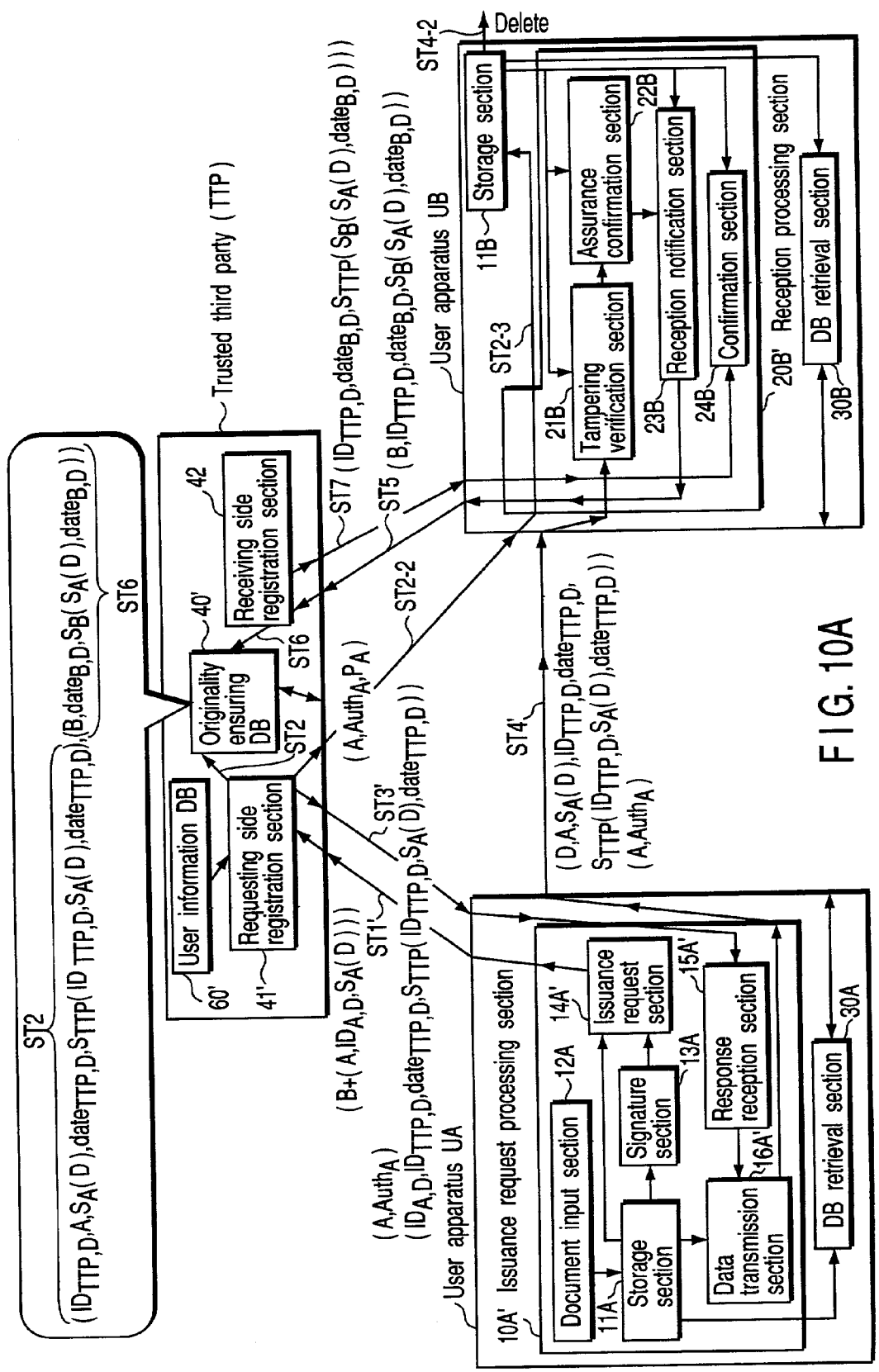
FIG. 10A is a schematic diagram showing operations of the originality ensuring system according to the third embodiment.
Figure 10B:
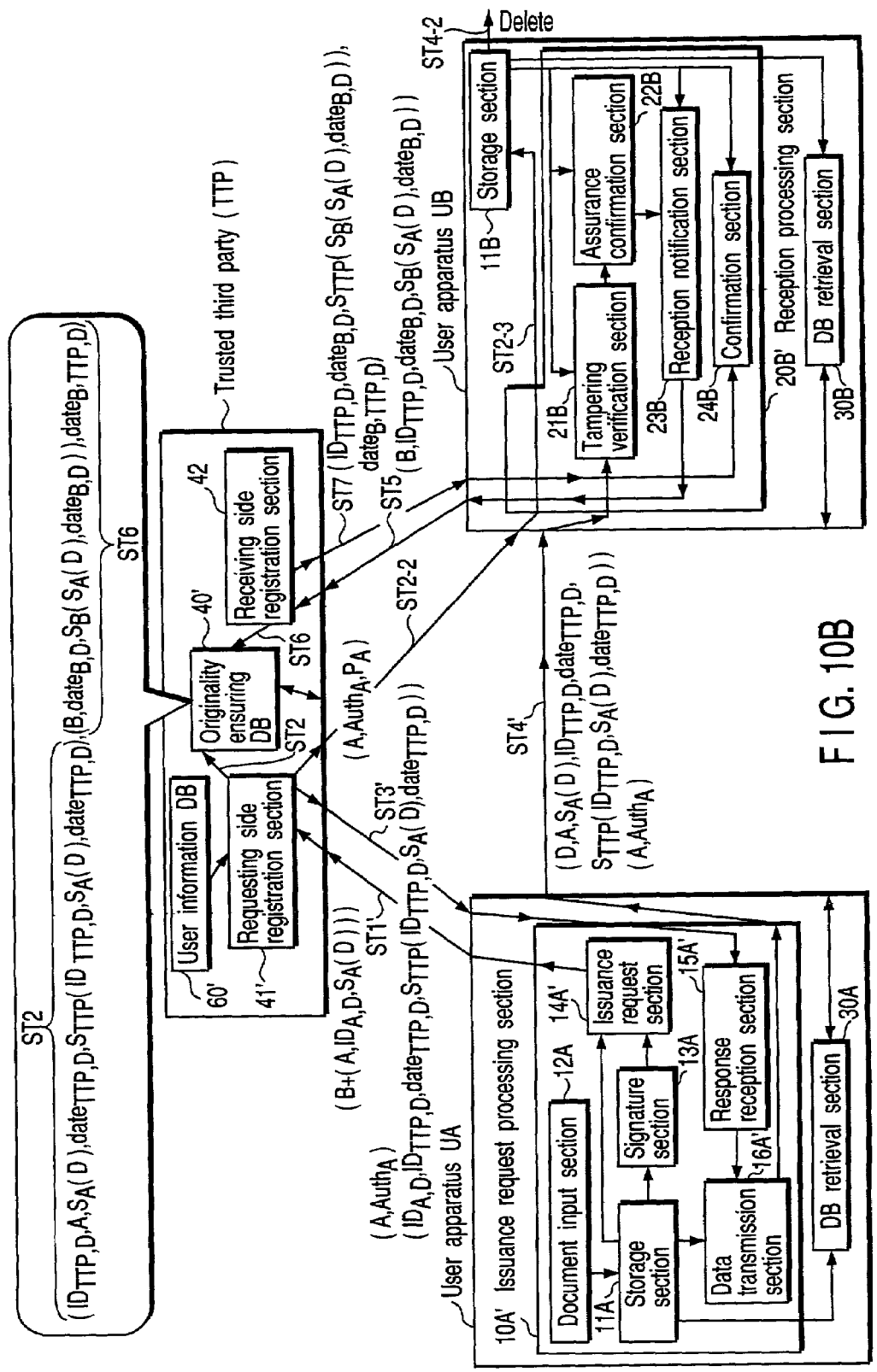
FIG. 10B is a schematic diagram showing modified operations of the originality ensuring system according to the first embodiment.
Figure 11:
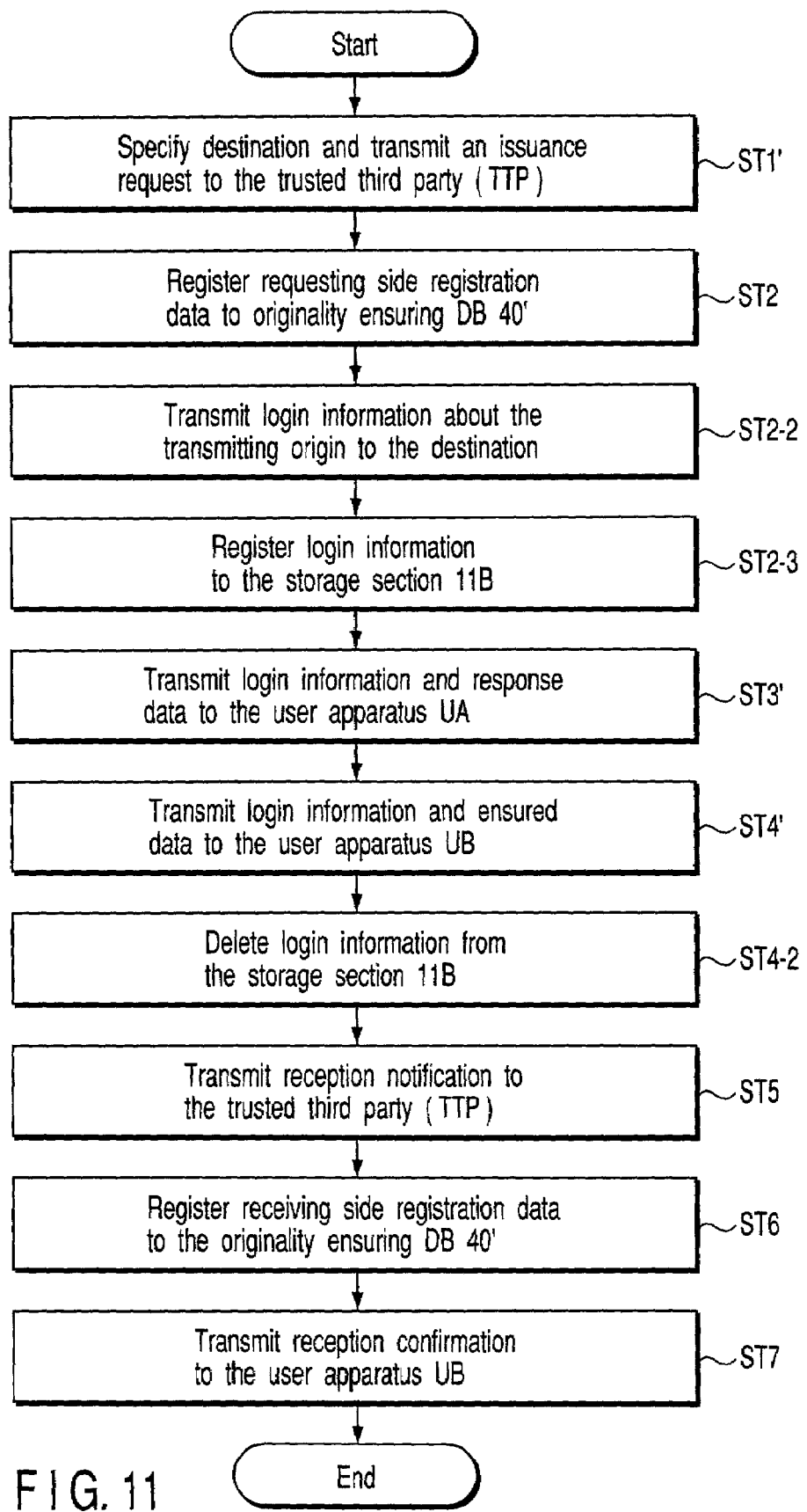
FIG. 11 is a flowchart explaining operations in the third embodiment.

The following describes operations of the thus configured originality ensuring system with reference to a schematic diagram in FIG. 10A or 10B and a flowchart in FIG. 11.

As mentioned above, it is supposed that the user apparatus UA generates digital signature $S_A(D)$ for electronic document D and writes digital signature $S_A(D)$ to the storage section 11A.

When an operator specifies a destination, the issuance request section 14A' transmits destination specification (B) to the trusted third party (TTP) (ST1').

As mentioned above, the requesting side registration section 41' of the trusted third party (TTP) registers requesting side registration data (ST2). By referencing the user information DB 60', this section transmits login information $\{A, Auth_A\}$ and public key certificate $P_A$ for the user A on apparatus UA to the specified destination user apparatus UB (ST2-2). The reception processing section 20B' of the user apparatus UB registers this login information $\{A, Auth_A\}$ and public key certificate $P_A$ to the storage section 11B (ST2-3).

Then, the requesting side registration section 41' of the trusted third party (TTP) transmits login information $\{A, Auth_A\}$ together with the above-mentioned response data $\{ID_{A,D}, ID_{TTP,D}, date_{TTP,D}, S_{TTP}(ID_{TTP,D}, S_A(D), date_{TTP,D})\}$ to the user apparatus UA (ST3').

The response reception section 15A' of the user apparatus UA writes this login information and response data to the storage section 11A, and then controls the data transmission section 16A'.

According to this control, the data transmission section 16A' transmits the aforementioned ensured data $\{D, A, S_A(D), ID_{TTP,D}, date_{TTP,D}, S_{TTP}(ID_{TTP,D}, S_A(D), date_{TTP,D})\}$ together with login information $\{A, Auth_A\}$ to the destination user apparatus UB.

The reception processing section 20B' of the user apparatus UB performs login processing based on this login information and the content registered at step ST2-3. After the login processing, suppose that the tampering verification section 21B and the assurance confirmation section 22B have completed the verification, for example. In this case, the reception processing section 20B deletes the current login information $\{A, Auth_A\}$ and public key certificate $P_A$ from the storage section 11B (ST4-2).

It is not necessary to delete the login information, if the accumulated login information does not have influence to the performance of the user apparatus UB, but in this case the login information for UA is not registered but renewed at the next processing of the login information transmit by the TTP.

Subsequently, the reception confirmation processing at steps ST5 to ST7 is performed as mentioned above.

As mentioned above, while the user apparatuses UB and UA eliminate the need for managing information about the counterpart (UA for UB or UB for UA), this third embodiment can perform login processing from the other user apparatus UA or UB in addition to the effects of the first embodiment.

In other words, it is possible to decrease costs for managing information about the other user apparatus by maintaining the security due to login processing.

This embodiment has described the case where the trusted third party (TTP) manages the user information DB 60'. The present invention is not limited thereto. It may be preferable to modify the embodiment so that an LDAP (Lightweight Directory Access Protocol) server connected to the trusted third party (TTP) manages the user information DB 60'.

The login system in this embodiment is applicable to not only the originality ensuring system, but also any system comprising one third party apparatus and two user apparatuses.

FOURTH EMBODIMENT

Figure 12:
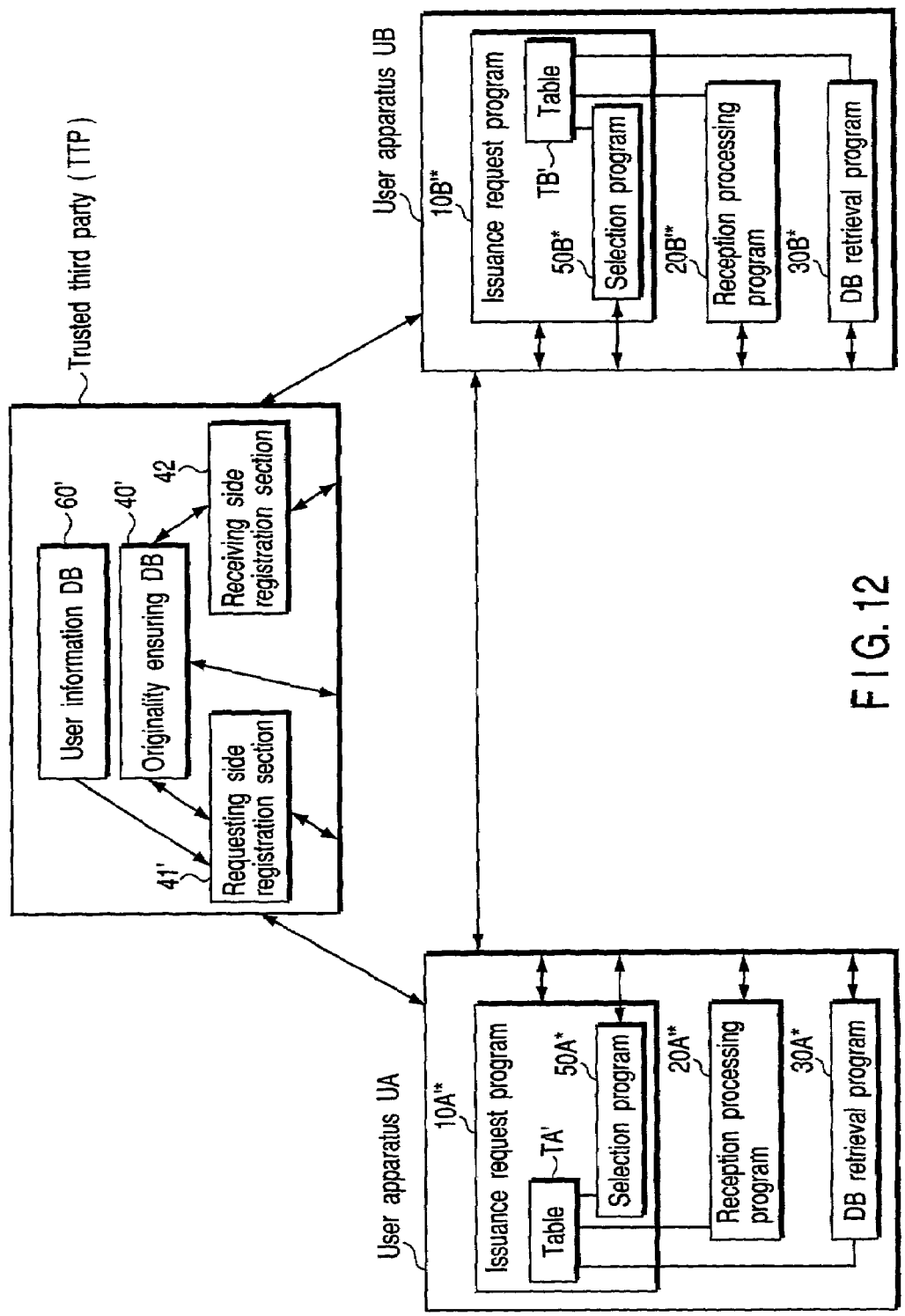
FIG. 12 is a schematic diagram showing the configuration of an originality ensuring portal service according to a fourth embodiment of the present invention.

FIG. 12 is a schematic diagram showing the configuration of an originality ensuring portal service according to a fourth embodiment of the present invention. This embodiment is configured by combining the system of providing the program in the second embodiment and the system of providing the login information in the third embodiment.

In FIG. 12, an issuance request processing program 10A'* of the user apparatus UA implements the feature of the issuance request processing section 10A' for the third embodiment.

Likewise, the reception processing program 20B'* implements the feature of the reception processing section 20B' for the third embodiment.

As shown in FIGS. 13A and 13B, tables TA' and TB' maintain information about the trusted third party (TTP) as mentioned above. Like the third embodiment, however, these tables do not maintain information about the other user apparatus UB or UA.

The following describes operations of the thus configured originality ensuring portal service.

As shown in FIG. 14, the originality ensuring portal service can request to selectively execute a registration service PS1' corresponding to the above-mentioned steps ST1' to ST4-2, the above-mentioned reception confirmation service PS2, and the above-mentioned originality confirmation service PS3.

As described in the third embodiment, when the registration service PS1' is requested for execution, the originality ensuring portal service performs operations from steps ST1' to ST4-2. These operations include processing for transmitting login information about the transmitting user apparatus UA to the destination user apparatus UB. When the other services PS2 and PS3 are requested, operations are the same as those for the second embodiment.

As mentioned above, this embodiment can provide the originality assurance service having effects equivalent to those of the third embodiment as a portal service like the second embodiment. It is possible to achieve the effects of the second and third embodiments at the same time.

The techniques described in the above-mentioned embodiments can be distributed as a computer-executable program stored on a storage medium. Available storage media include magnetic disks such as a floppy disk (registered trademark), a hard disk, etc., optical disks such as CD-ROM, DVD, etc., optical magnetic disks (MOs), semiconductor memory, etc.

The storage medium may have any storage format if the storage medium can store programs and can be read from a computer.

It may be preferable to execute part of the processing for implementing the embodiment by using an OS (operating system) or MW (middleware) such as database management software, network software, etc. running on the computer based on instructions from the program installed on the computer from the storage medium.

The storage medium according to the present invention is not necessarily independent of the computer. It is also possible to use a storage medium which continuously or temporarily stores the downloaded program transmitted via LAN or the Internet.

The present invention is not limited to the use of a single storage medium. The present invention is applicable to the use of a plurality of storage media for performing the processing in this embodiment. It may be preferable to use any configuration for storage media.

A computer according to the present invention should perform each processing in this embodiment based on the program stored in the storage medium. The computer may be configured to be a stand-alone apparatus such as a personal computer, a system in which a plurality of apparatuses are networked, or any other form.

The computer according to the present invention is not limited to a personal computer, but covers a processor, a microcomputer, etc. contained in the information processing equipment. Here, the computer is a generic name for equipment or apparatus capable of implementing the features of the present invention by means of a program.

The present invention is not limited to the above-mentioned embodiments. Furthermore, the present invention may be embodied in various modifications without departing from the spirit and scope of the invention. The embodiments may be appropriately combined in every possible form. In this case, the combined effects are provided. The above-mentioned embodiments include inventions at various stages. It is possible to extract various inventions according to a proper combination of a plurality of constituent features disclosed. When an invention is extracted by omitting some of all the constituent features presented in the embodiments, the extracted invention is embodied by properly supplementing the omitted constituent features with well-known prior arts.

The present invention may be otherwise variously embodied within the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer program relating to an originality ensuring system which has a third party apparatus managing a database registering login information about said respective entity apparatuses, supplies originality ensuring digital signature of said third party apparatus to a first digital signature supplied to electronic data by a first entity apparatus, and in this way ensures originality of said electronic data for a second entity apparatus, said computer program stored in a computer-readable storage medium used for said second entity apparatus comprising:

a first program code which is previously provided with login information about a transmitting first entity apparatus from said third party apparatus and then saves this login information;

a second program code which receives a login request and a set of said originality ensuring digital signature, electronic data, and first digital signature from said first entity apparatus and then performs login processing based on said login information;

a third program code which, upon completion of said login processing, verifies said electronic data based on said originality ensuring digital signature and said first digital signature said first entity apparatus;

a fourth program code which generates an undeniable digital signature for a set of said first digital signature and second date information when said verification result is valid;

a fifth program code which transmits reception confirmation including said generated undeniable digital signature to said third party apparatus; and a sixth program code which deletes said login information when said verification result is valid.

* * * * *